United States Patent [19]

Weisgerber

[11] Patent Number: 5,121,977
[45] Date of Patent: Jun. 16, 1992

[54] APPARATUS FOR RAISING AND LOWERING THE LOWER SCREEN MASK IN A MOTION PICTURE THEATER

[76] Inventor: Robert C. Weisgerber, 246 E. 93d St., New York, N.Y. 10128

[21] Appl. No.: 489,958

[22] Filed: Mar. 7, 1990

[51] Int. Cl.$^5$ .................. G03B 21/56; G03B 37/00
[52] U.S. Cl. .................... 359/450; 352/43; 352/69
[58] Field of Search .............. 350/124; 352/69, 43

[56] References Cited

U.S. PATENT DOCUMENTS

| | | | |
|---|---|---|---|
| 490,482 | 1/1893 | MacKaye | 350/124 |
| 1,200,845 | 10/1916 | Johnson | 350/124 |
| 1,734,467 | 11/1929 | Howard | 350/124 |
| 1,857,673 | 5/1932 | Vallen | 350/124 |
| 1,882,828 | 10/1932 | Hall et al. | 350/124 |
| 1,904,963 | 4/1933 | Vallen | 350/124 |
| 1,954,656 | 4/1934 | Vallen | 250/203 R |
| 3,475,086 | 10/1969 | Vetter | 350/124 X |
| 3,502,402 | 3/1970 | Markson | 350/124 X |
| 4,915,496 | 4/1990 | Stine | 352/69 |

*Primary Examiner*—Richard A. Wintercorn
*Attorney, Agent, or Firm*—David Peter Alan

[57] ABSTRACT

The device described here allows for the raising or lowering of the mask which sits along the bottom edge of the screen in a motion picture theater and, along with the top and two side masks, frames the entire screen. The lower mask is supported by a number of support units, each containing two arms, equal in length and pivotally joined at their apex, where they are also attached to the bar that supports the screen mask. The arms are moved further apart or closer together at their lower ends, so that they push the bar supporting the screen mask up or down. A rotating shaft, with sections of oppositely-pitched threads, is connected to a motor. Sleeves with complimentary inside threads are pivotally mounted to the support arms, such that rotation of the motor in one direction moves the loser ends of the arms further apart and rotation in the other direction brings the lower ends of the arms closer together. Thus, the screen mask can be raised or lowered by motor rotation in one direction or the other. To ensure that the lower ends of the arms move only along the desired pathway, roller bearings are mounted to the sleeves housing the inside threads which complement the threaded rods. These roller bearings move on a fixed track, in the same direction as the sleeve, and tightly enough to support the weight of the entire apparatus. This track is mounted to the floor. This system can be operated manually or automatically, in response to signals applied to the film, which direct the motor (or motors) to turn a precise number of rotations in the desired direction.

13 Claims, 1 Drawing Sheet

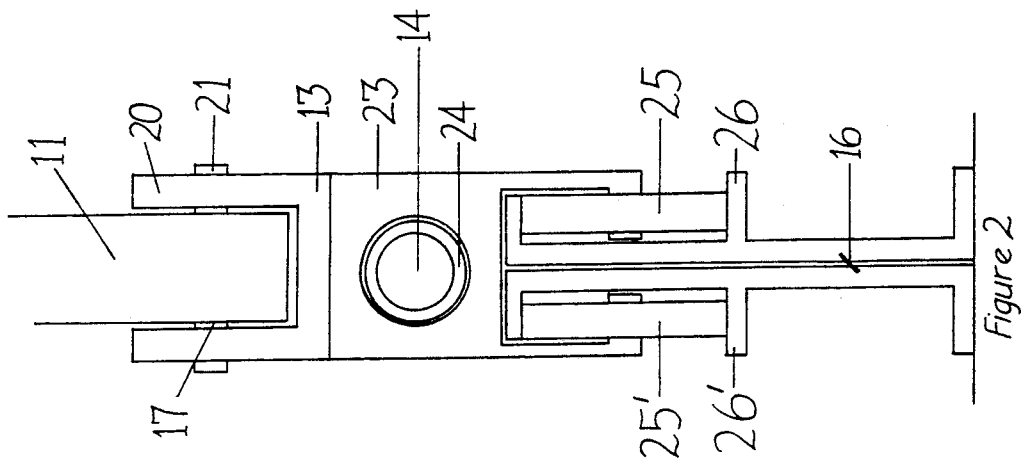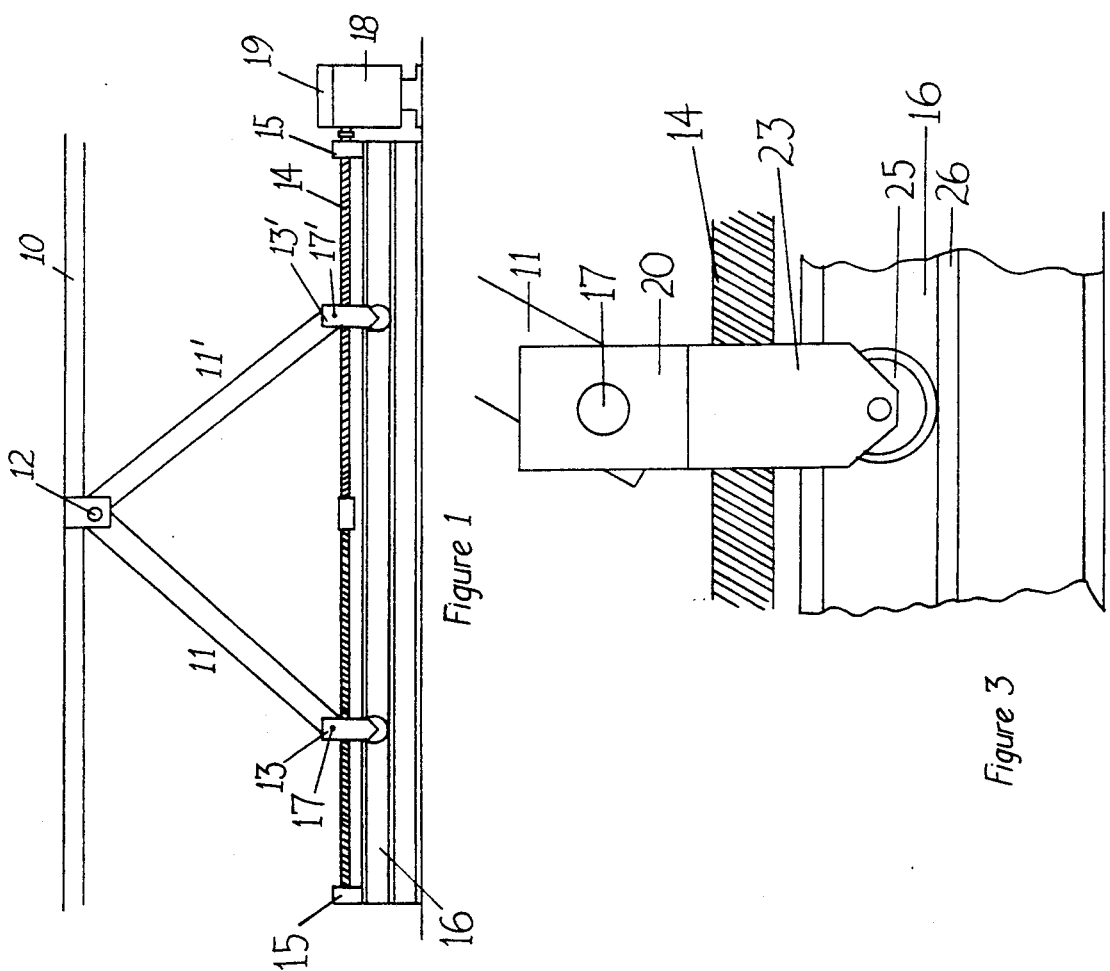

APPARATUS FOR RAISING AND LOWERING THE LOWER SCREEN MASK IN A MOTION PICTURE THEATER

BACKGROUND OF THE INVENTION

This is a co-pending application, related to Weisgerber, Motion *Structure Production and Exhibition System,* Application No. 07/228,495, filed Aug. 7, 1988. The parent application discloses a multi-component system for variably producing a high-impact, picture-dominance effect on motion picture audiences in a manner compatible with existing motion picture photographic and projection equipment, and in a configuration that can be installed in a conventional motion picture theater. The system disclosed in the parent application also produces the picture-dominance effect in a manner that permits switching the effect in or out of the system, alternating between conventional and high-impact experience as an aid to advancing the story line of the motion picture.

As part of the overall picture dominance system, the screen must be formatted and masked to appear to cover the entire front wall of the auditorium in which it is located. To achieve the necessary picture dominance effect, the screen must be side enough to cover a field of view at least 60° wide and tall enough to present an elevational angle of at least 15° above the horizontal, as seen by a member of the audience. For the picture dominance illusion to work, the viewers must not be able to see space around the screen or architectural features of the auditorium.

To provide the sharp framing that is needed for the overall effect, masks frame the screen on all four sides. Screen masking has long been known in the cinema art and was advanced considerably by the Vetter D-150 system (3,475,086). Vetter designed masking systems to frame a deeply-curved screen, producing a field of view 150° wide, utilizing 70 mm film. The Vetter system yielded limited utility and versatility, however. His system was designed primarily for use with 70 mm film (aspect ratio 2.21:1). With movement of the upper and side screen masks, other aspect ratios could be accommodated, such as 1.85:1 (conventional 35 mm) or 2.39:1 (35 mm anamorphically compressed horizontally; "CinemaScope").

In practice, the actual D-150 installations placed air ducts immediately below the screen, resulting in high sight lines that reduced the effect of picture dominance. As practiced, Vetter's invention did not allow for the mechanical system that would move the lower mask to expose additional curved screen surface. In the system described in the parent application, 70 mm film is anamorphically compressed and expanded in the vertical direction by factors ranging from 1.25 to 1.5, yielding aspect ratios ranging from 1.77:1 to 1.48:1. In one embodiment of the system, anamorphic expansion by a factor of 1.33 yields an aspect ratio of 1.66:1. For image dominance to work, a screen wide enough to show conventional 70 mm films must be up to 50% taller than the Vetter screen to accommodate the extra vertical component caused by the anamorphic expansion. The original Vetter configuration would be inappropriate for the picture dominance mode described in the parent application, since it would be necessary to expose more viewing area at the bottom of the screen than Vetter had envisioned.

Methods for moving the top and side masks have been known for many years, and Vetter used these methods. The upper mask can be moved by a series of cables and pulleys, so that a motor would rotate a shaft in one direction to pull the mask up by "reeling in" the cables. Rotation in the other direction would produce momentary slack in the cables, allowing the weight of the mask to extend the cables to their full length as they were unwound. Side masks could be moved on reciprocating traverse rods, also controlled by a motor.

The system described in the parent application discloses the variation of screen size and aspect ratio between scenes or sequences within a single motion picture presentation. To accomplish this, it is necessary to move all four masks at the same time, so the picture will retain its horizontal and vertical symmetry as the picture-dominance mode is delivered or withdrawn. The effect requires exposure of extra screen surface along the lower edge, an idea not envisioned by Vetter. As practiced, Vetter's invention did not allow for the mechanical system that would move the lower mask to expose additional screen surface. In addition, the idea of moving all masks simultaneously to change frame size or aspect ratio during a picture did not occur to Vetter as useful (col. 3, lines 36–19):

Regardless of the photographic lens) which is used, the aspect ratio or screen size is rarely changed from scene to scene, or sequence to sequence, in projection, although it could be.

The ability to move all four masks is a necessary part of the new system which expands the creative control available to the filmmaker. While manual operation of the lower screen mask system described here is possible, automatic control allows movement during a single picture. This automatic activation of mask movement, as will be described, can also be used to facilitate motion picture theater operations.

BRIEF DESCRIPTION OF THE INVENTION

The system described here is a component of a variable screen masking system, capable of moving all four screen masks at the same time. The upper and side masks are moved through the use of systems already known in the art. It is the lower mask subsystem that is novel.

The system described can accommodate any standard or nonstandard aspect ratio, such as 1.33:1 (16 mm) or 2.39:1 (CinemaScope). Other formats, whether or not they are currently in use, can also be accommodated. It is also envisioned that the system can accommodate conventional 70 mm format (2.21:1) and open the masks during a picture to accommodate a 70 mm format which is anamorphically compressed in the vertical direction, yielding aspect ratios in the range of 1.48:1 to 1.77:1. Reclosing the masks can again deliver the conventional aspect ratio and other features of the conventional 70 mm film experience.

The lower screen mask sits on a bar, made of wood or a metal such as aluminum. The mask is made of a suitable curtainlike material and is curved to match the curvature of the screen. A number of identical units, located at evenly-spaced intervals, support the mask. Each unit contains two arms which are pivotally mounted to each other and to the mask bar at their apex. These arms form an isosceles triangle, the base of which is parallel to the floor and the altitude of which is varied by operation of the system described.

To narrow the base, thereby raising the altitude or to broaden the base, thereby lowering the altitude of the triangle, the lower ends of the arms are moved closer together or further apart. This is accomplished by a motor, which turns a rod which contains two sections of oppositely-pitched threads. A sleeve bearing complimentary inside threads is fixed in position under each arm, with only one degree of freedom permitted; moving further apart or closer together along the threaded rod. These sleeves are pivotally mounted to the arms, the lower ends of which must also move further apart or closer together.

A fixed track, mounted to the floor (or to a base which is itself mounted to the floor) eliminates any rotational motion or translational motion of the arms from side to side. The sleeve, which contacts the threaded rod, is fixedly attached to a bearing assembly that slides along the track. It is also pivotally attached to the arms, thereby increasing or decreasing the altitude of the triangle formed by the arms as they are moved closer together or further apart.

The system can be operated manually or in response to signals recorded onto the film to be shown. In the preferred embodiment, each support unit is controlled by a separate motor, although it is also possible to use one motor for two units or to couple all units together for single-motor operation. For automatic operation, cue signals applied to the film (signals can be analog or digital and can be recorded in the same mode as the audio portion of the film) activate the motors to turn a specific number of rotations or degrees of a partial rotation. AC synchronous motors with shaft encoders are used in the preferred embodiment, and a feedback mechanism stops rotation when the required number of turns have been completed. For the reverse operation, other signals active the motors to turn in the opposite direction. All motors are synchronized, and the system described here operates in conjunction with the subsystems which move the top and side masks at the same time.

The events described above are sufficient to change screen sizes and aspect ratios between films, and such switching can be coded onto lengths of leader to be inserted into a film program on a single platter. The masks can also be moved automatically for establishing or withdrawing a high-impact picture-dominance effect within a single motion picture. For the overall picture dominance effect, other signals are used to change projector frame rate and screen brightness.

BRIEF DESCRIPTION OF THE DRAWINGS

FIG. 1 is a plan view of the system configuration as installed.

FIG. 2 is a cross-sectional view of a movable support unit, as shown along the line designated 2—2 in FIG. 1.

FIG. 3 is a side view of a movable support unit, looking toward the front of the auditorium, as if the collars onto which other components are mounted were transparent.

FIG. 4 shows a cross-section of the track along which the movable support units are permitted to slide.

DETAILED DESCRIPTION OF THE INVENTION

This invention consists of a number of identical units which raise or lower the bottom screen mask, as directed. At least two such units are required, for a small theater showing only conventional films. For a large theater, equipped for showing 70 mm films and capable of accommodating the picture-dominance system described in the parent application, at least three such units are necessary. The units are evenly-spaced and close enough to the outside edges of the screen to prevent the mask from sagging at the ends. In the accompanying drawing, three such units are pictured. All are identical and the description will apply to all three.

FIG. 1 shows the overall system configuration. Bar 10 supports the screen mask. It is curved slightly toward the rear of the auditorium to match the curvature of the screen, although this curvature is not shown in the illustration. The bar can be made of any suitable material, such as wood or aluminum; and the mask (not shown) can be made of any material traditionally used for the purpose.

Arms 11 and 11' for each support unit are set at opposite angles with their lower ends spread a specific (and variable) distance apart and with their upper ends meeting at the apex of a triangle which arms 11 and 11' form with a line parallel to the floor. At the apex of this triangle is point 12, where arms 11 and 11' are joined pivotally anywhere they are also coupled to bar 10. At Point 12, a pivot pin joins arms 11 and 11', so they are pivotally mounted with respect to each other. The same pivot pin is also attached to a collar, which is bolted to bar 10. These pivot points support the weight of the screen mask. Sliding units 13 and 13' are pivotally mounted to the lower ends of arms 11 and 11' and contain sleeves with inside threads. Threaded rod 14 contains two sections, each with oppositely-pitched outside threads, and each complimentary to the inside threads on the sleeves of slidable units 13 and 13'. Threaded rod 14 is held in position by tie plates 15 and acts as a worm gear; the oppositely-pitched sections moving units 13 and 13' further apart or closer together, depending on the direction in which rod 14 rotates.

In order to help support the weight of the arms, screen mask and other components of the system, and to restrict movement to the only degree of freedom allowed (along rod 14), track 16 is fixed to the floor. Track 16 consists of two elongated members, parallel to each other and with a cross-sectional structure like two I-beams, one on top of the other. Both sides of Track 16 are bolted to the floor, or to a support base which is, itself, bolted to the floor. When rod 14 turns, units 13 and 13' move, as directed by the inside threads on the sleeves within them. Track 16 accommodates wheels on units 13 and 13', so that units 13 and 13' fit tightly against track 16. This tight fit prevents any translational motion and prevents the system (which could be top-heavy) from falling over. Arms 11 and 11' are pivotally mounted to units 13 and 13' at pivot points 17 and 17', which are located at the tops of units 13 and 13'.

As rod 14 rotates in one direction, units 13 and 13' are moved further apart. The lower ends of arms 11 and 11' pivot at pivot points 17 and 17', thereby reducing the altitude of the triangle formed by arm 11, arm 11' and the line between pivot points 17 and 17'. Bar 10, and the screen mask which it supports, are lowered and more screen surface is exposed. For the reverse operation, rotation of rod 14 in the other direction brings units 13 and 13' closer together. The lower ends of arms 11 and 11' pivot in the other direction at pivot points 17 and 17', thereby increasing the altitude of the triangle formed by arm 11, arm 11' and the line between pivot points 17 and 17'. Bar 10 is thus raised and the lower portion of the screen concealed.

Motion is accomplished by motor 18, which is an AC synchronous motor equipped with shaft encoders to count precise numbers of rotations and degrees of a partial rotation. Motors are all synchronized by responding to identical signals, either manually induced or recorded onto the film for automatic operation. Motor controller 19 provides the interface between the cue signals which activate motor 18 and motor 18 itself. As a protective device, limit switches (conventional microswitches will do) terminate rotation of motor 18 when the mask is in either the highest or lowest position attainable.

FIG. 2 shows a cross-section of one movable unit. Outside threads on rod 14 engage complimentary inside threads on sleeve 24, which is held in place by collar 23. The means of affixing sleeve 24 to collar 23 is not critical. Below sleeve 24 on collar 23 are wheels 25 and 25'. Wheels 25 and 25' move along track 16, as embodied by its parallel members, 26 and 26'. Track members 26 and 26' are bolted to the floor. Thus, movement of sleeve 24 along threaded rod 14 also causes movement of wheels 25 and 25' along track members 26 and 26'. Above collar 23 is another collar 20, with open end facing upward. Arm 11 sits inside collar 20, pivotally mounted to it at pivot point 17 by pivot pin 21. Arm 11' is pivotally mounted to movable unit 13', facing in the opposite direction. FIG. 3 shows a side view of the same apparatus, as if collars 21 and 23 were transparent. It should be noted that wheels 25 and 25' are located on the lateral surfaces of track members 26 and 26'.

For automatic operation, motor 18 is activated by cue signals recorded onto the film. These signals can be analog (tones or pulses) or digital (bursts of data), and they are recognized by a microprocessor which acts as a General Purpose Interface (GPI) device. The microprocessor emits voltages which activate motor 18, causing it to turn a specific number of rotations and degrees of a partial rotation. Threaded rod 14 also turns the same amount, since it is attached concentrically to the shaft of motor 18 by a coupling.

As an example of the system in operation, it is desired to change from "conventional" film mode into the high-impact picture dominance operation. Cue signals from the film are read by the microprocessor, which emits voltages that activate the system to lower the bottom mask and expose more viewing area at the bottom of the screen. A signal is sent to activate motor 18, which begins to turn, thereby rotating threaded rod 14. The interaction between the oppositely-pitched sections of rod 14 and the inside threads on sleeves 24 and 24' on units 13 and 13' pushes units 13 and 13' further apart. The lower ends of arms 11 and 11' also move further apart, since they are attached to units 13 and 13'. This decreases the altitude of the triangle formed by arm 11, arm 11' and the line between pivot points 17 and 17'. Pivot point 12 is thereby lowered, further lowering mask bar 10, to which it is attached. Therefore, the screen mask, which sits atop bar 10, is lowered and more viewing area is exposed.

Other signals recorded on the film activate movement of upper and side screen masks, increase projector speed from 24 to 30 frames per second and increase screen brightness. Other cue signals terminate the process when the transition is complete. The shaft encoder forms part of a feedback loop, registering when the precise number of required rotations has been completed and sends a signal to the motor controller which tells the motor to stop turning. For the return to conventional experience, other signals activate the reversal of each of the above events.

Although the system described is intended primarily as part of an overall system to modulate picture dominance and the high-impact effect for greater creative control of the cinematic experience, the system also advances the technology of motion picture theater operations. For example, films in several formats (such as 35 mm, 70 mm and 35 mm anamorphically compressed horizontally) can be combined onto a single platter for an entire evening's program. Films can be coded (by tabbing, notching, cue tones or any other method) to alert the microprocessor that a change in screen size or aspect ratio is coming. At the time the film changes, control signals also activate the system that moves all four screen masks (including the subsystem described here) to accommodate the format for the new film. This feature can be combined with other operational features, such as mounting an anamorphic expansion objective on a revolving turret and activating rotation of the turret at a signal between films to turn the turret to bring the anamorphic lens into position for use.

The foregoing examples describe the preferred embodiment of the invention. It is intended to be illustrative and not limiting, and other embodiments are possible. A motor could be placed between two threaded rods to operate two pairs of support arms. Alternatively, all threaded rods could be mechanically coupled and a single motor could be used to turn them all. Furthermore, control information can be coded into the film in any manner known in the cinema art. Other alternative embodiments are possible and should be considered as lying within the scope of the invention.

The invention claimed is:

1. A system for raising and lowering the mask which frames the lower edge of the screen in a motion picture theater, comprising: a bar to which said lower screen mask is fixedly attached and below which said screen mask hangs; a plurality of members which are capable of supporting the weight of such screen mask, such members being paired and mechanically linked to operate reciprocally with the effect that said bar is raised or lowered depending on the movement of such members; a means for connecting such support members to accommodate such reciprocating motion; a means for determining precisely how far apart or how close together such members will be at any given time and a means for accomplishing the motion which moves said support members closer together or further apart.

2. An apparatus as in claim 1, in which said bar is curved according to the curvature of the screen framed by such mask.

3. An apparatus as in claim 1, in which the movement of such support members is accomplished by means of a shaft equipped with screw threads, such threads complimenting inside threads on tubular members, which are themselves pivotally attached to said support members, which move closer together or further apart, according to the rotational motion of such shaft.

4. An apparatus as in claim 3, in which said shaft is comprised of discrete pairs of sections corresponding to each pair of support members, the outside threads of such sections being oppositely pitched.

5. An apparatus as in claim 3, in which said support members are pivotally mounted at their upper ends to the bar on which said screen mask sits and pivotally mounted at their lower ends to the tubular members whose reciprocating motion is accommodated by the rotational motion of said shaft.

6. An apparatus as in claim 1, in which the means for providing such motion is one or more AC synchronous motors.

7. A system as in claim 6, in which said motor is directed to rotate a precise number of rotations and degrees of rotation, in either direction as required, by means of signals recorded onto the film being shown.

8. A system as in claim 1, further comprising a means for slidably mounting said tubular members to a fixed support surface, with the purpose of preventing said support members from deviating from a vertical position.

9. A system as in claim 8, in which the means for such slidable mounting comprises an elongated member or pair of parallel members fixedly mounted to the floor of the room in which said system is installed or to a base also fixedly mounted to the floor and parallel to the line along which said tubular members travel, a means for slidably mounting said tubular members to said elongated member held in fixed position, and a means for filling all space between said elongated member and said slidable mounting means.

10. A system as in claim 9, in which said slidable mounting means comprises a pair of wheels fixedly mounted to the mounting means to which said tubular members are attached, and rotatably engaging said elongated member or pair of elongated members, to permit linear motion along the line defined by such elongated member of members.

11. A system as in claim 7, further comprising a means for determining when sufficient rotations of said motor have been accomplished and deactivating said motor following such completion.

12. A system as in claim 11, further comprising a means for ceasing all rotation of said motor when the maximum amount of rotation of said motor has been accomplished.

13. A system as in claim 12, in which such means for the cessation of rotation is a microswitch or plurality of microswitches.

* * * * *